(12) United States Patent
Yockey

(10) Patent No.: US 8,913,063 B2
(45) Date of Patent: Dec. 16, 2014

(54) PATTERN DETECTION OF AVATARS IN A VIRTUAL ENVIRONMENT

(75) Inventor: Kevin Yockey, Kelowna (CA)

(73) Assignee: Disney Enterprises, Inc., Burbank, CA (US)

(*) Notice: Subject to any disclaimer, the term of this patent is extended or adjusted under 35 U.S.C. 154(b) by 400 days.

(21) Appl. No.: 12/870,613

(22) Filed: Aug. 27, 2010

(65) Prior Publication Data

US 2012/0050286 A1   Mar. 1, 2012

(51) Int. Cl.
*G06T 13/00* (2011.01)
*G06N 3/00* (2006.01)

(52) U.S. Cl.
CPC ..................... *G06N 3/006* (2013.01)
USPC ............. 345/473; 382/181; 382/229

(58) Field of Classification Search
USPC .................. 345/473, 420; 382/181
See application file for complete search history.

(56) References Cited

U.S. PATENT DOCUMENTS

| | | | | |
|---|---|---|---|---|
| 6,229,533 B1* | 5/2001 | Farmer et al. | ............... | 345/473 |
| 6,454,653 B1* | 9/2002 | Kawazu | ............... | 463/43 |
| 6,525,736 B1* | 2/2003 | Erikawa et al. | ............... | 345/473 |
| 2008/0204450 A1* | 8/2008 | Dawson et al. | ............... | 345/419 |
| 2009/0049513 A1 | 2/2009 | Root et al. | | |
| 2009/0177670 A1 | 7/2009 | Grenier et al. | | |
| 2009/0177979 A1 | 7/2009 | Garbow et al. | | |
| 2010/0057478 A1 | 3/2010 | Hamilton et al. | | |
| 2010/0060649 A1* | 3/2010 | Haggar et al. | ............... | 345/474 |
| 2010/0079446 A1* | 4/2010 | Betzler et al. | ............... | 345/419 |
| 2010/0082798 A1* | 4/2010 | Bhogal et al. | ............... | 709/224 |
| 2010/0162403 A1 | 6/2010 | Dawson et al. | | |
| 2010/0162404 A1* | 6/2010 | Dawson et al. | ............... | 726/26 |
| 2010/0169125 A1* | 7/2010 | Dawson et al. | ............... | 705/4 |

OTHER PUBLICATIONS phpBB, PCL, Nov. 2009, http://www.penguinclientsystem.com/forum/viewtopic.php?f=7&t=420.*
Anonymous: "My bot formations", Penguin Client Library (PCL), PCL 2.0 General Discussion Board, Nov. 2, 2009, pp. 1-10, retrieved Nov. 4, 2011 from <<www.penguinclientsystem.com/forum/viewtopic.php?f=7&t=420&p=3430#p3430>>.
European Patent Office Search Report dated Dec. 21, 2011, for EP Application No. 11179027.5.

* cited by examiner

*Primary Examiner* — Daniel Hajnik
*Assistant Examiner* — Naveed Hasan
(74) *Attorney, Agent, or Firm* — Patterson + Sheridan, LLP

(57) ABSTRACT

Techniques are described for detecting script-controlled avatars in a virtual environment engaging in certain pattern formation behaviors. In particular, a virtual environment server may select a group of avatars and determine a pattern formed by the selected group. The virtual environment system may further search for a match of the pattern from a library of prohibited words or symbols. In the event the pattern formed by the selected avatars matches one of the prohibited patterns, some form of remedial action may be performed to disrupt the pattern.

19 Claims, 5 Drawing Sheets

PATTERN DETECTION OF AVATARS IN A VIRTUAL ENVIRONMENT

BACKGROUND

1. Field

The invention is directed to computer-based virtual environments, and in particular, to moderating the behavior of script-controlled avatars in virtual online environments.

2. Description of the Related Art

Multiplayer online environments are a popular form of online entertainment. They generally include computer users interacting with each other in a computer simulated environment. The computer users are generally represented by a virtual avatar. Each user may control the behavior of their avatar to move through the computer simulated environment, achieve gaming (or other) objectives and interact with other users and/or non-player characters.

Online safety and content appropriateness is a prominent concern for the providers of an online environment, particularly for online environments where users may include children. To promote safety, online environment providers frequently employ safety or filtering features to reduce obscene language or other inappropriate communication. For example, an online environment provider may process and filter user-to-user chat messages by removing swear words, slurs, or other known terms of disparagement. In another example, an online environment provider may limit chat messages to a pre-selected choice of words or phrases provided for a user to select and communicate other users.

Despite the implementation of safety features, some users may nevertheless engage in destructive or subversive behavior in the online environment. For example, a user may employ computer-controlled avatars, known as bots, in a scripted, automated fashion in order to coordinate movement of the avatars in a scripted, synchronized formation, also known as "formation bots." Formation bots may appear similar to words or shapes that would otherwise be prohibited by chat safety filters. The appearance of these prohibited words or shapes may damage the value and reputation of the online environment and expose other online players to inappropriate language.

SUMMARY

One embodiment of the invention provides a computer-implemented method for moderating a virtual environment. The method may generally include selecting a group of avatars based on predetermined attributes of the group of avatars and determining a first pattern formed by the group of avatars in the virtual environment. If the first pattern matches a second pattern, the virtual environment is moderated by performing a remedial action to disrupt the first pattern.

In a particular embodiment, the second pattern may represent a word, symbol, or shape prohibited in the virtual environment. The predetermined attributes may be used to identify a group of avatars believed to be controlled by a common user (or users). Further, the remedial action may be to displace one or more of the avatars in the group of avatars from an initial location in the virtual environment to a second location. The remedial action may also include disconnecting one or more of the avatars in the group of avatars from the virtual environment.

BRIEF DESCRIPTION OF THE DRAWINGS

So that the manner in which the above recited aspects are attained and can be understood in detail, a more particular description of embodiments of the invention, briefly summarized above, may be had by reference to the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
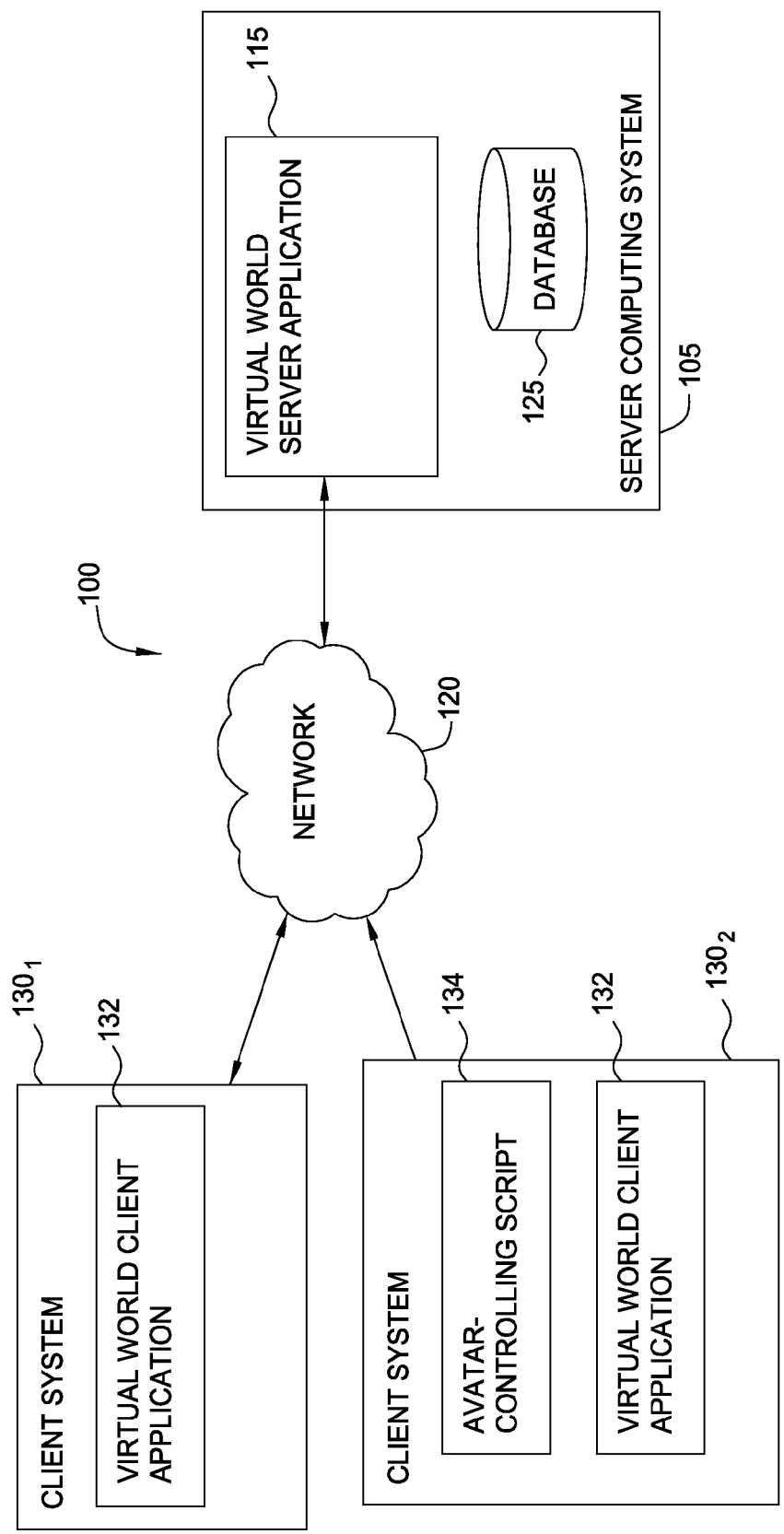
FIG. 1 illustrates a computing infrastructure configured according to one embodiment of the invention.

Embodiments of the invention provide techniques for pattern detection of coordinated avatar behavior in a virtual environment. Generally, users may control a group of avatars within a virtual environment using scripts that send commands to the virtual environment. That is, one user may coordinate the actions of multiple avatars visible to a group of users within the online environment using a programming script. For example, such programming scripts may include instructions for controlling multiple avatars at once to move in a synchronized fashion. In situations with so-called "formation bots", the scripts control the movement and position of a group of avatars to create formations which resemble words, symbols, or shapes on command. These formations may include innocuous words, but may also include offensive or inappropriate words or symbols.

In one embodiment, pattern recognition may be used to detect avatars attempting to form any given formation (e.g., an offensive word or symbol). However, given the tendency of users to congregate in large numbers at key points within a popular online service, it becomes statistically likely that a given pattern will eventually be matched by the uncoordinated actions of multiple users, each controlling one avatar. Accordingly, subgroups of avatars may be selected for the pattern matching process. For example, all the avatars accessing the online service from a common IP address or corresponding to a user or user accounts created at more or less the same time may be selected. More generally, a monitoring system may select a group of avatars based on attributes, determine a pattern formed by the group of avatars and perform pattern detection on the determined pattern against a library of prohibited words, shapes, or expressions. In the event the subgroup matches one of the prohibited patterns, some form of remedial action may be performed. For example, if a prohibited pattern is identified (e.g., an offensive or unwanted word or symbol) the avatars participating in the pattern (i.e., the avatars in the selected subgroup) may be disconnected from the online service. Alternatively, the virtual environment could disrupt the pattern by overriding the scripted commands for some of the avatars participating in the formation. That is, the virtual world server could cause some of the avatars in a subgroup to move, disrupting the pattern.

Other approaches of preventing script-controlled behavior may include preventing more than a single avatar originating from a client using a network address. However, in some environments, due to internal network architectures such as a Network Address Translation (NAT) scheme, independent clients may nonetheless share a network address. In those cases, the solution may be to cap at some threshold value the number of clients originating from a single IP address. For example, the system may limit the number of users which can log in from a single IP address. In another approach, a virtual environment server may analyze incoming events and client requests to identify discover suspicious activity. Analysis may include monitoring the timing of commands for high frequency and high volume of events originating from a single source over a given time. However, malicious users may develop workarounds that defeat such timing analysis, and a pattern-detection-based approach as described herein may detect shapes regardless of timing behavior (i.e., how long a script may take to build the shape.) As such, the technique described herein may reduce false positives and increase the accuracy of detection of script-controlled behavior within virtual environments.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As one skilled in the art will appreciate, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be used. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a computing infrastructure configured for detecting patterns formed by a group of script-controlled avatars, according to one embodiment of the invention. As shown, the computing infrastructure 100 includes a server computer system 105 and a plurality of client systems $130_{1-2}$, each connected to a communications network 120. The server computer 105 includes a virtual environment server 110 and a database 125.

In one embodiment, the computing infrastructure 100 may include existing computer systems, e.g., desktop computers, server computers, laptop computers, tablet computers and the like. The computing environment 100 illustrated in FIG. 1, however, is merely an example of one computing environment. Embodiments of the present invention may be implemented differently, regardless of whether the computer systems are complex multi-user computing systems, such as a cluster of individual computers connected by a high-speed network, single-user workstations or network appliances lacking non-volatile storage. Further, while FIG. 1 illustrates a client-server model, other models are contemplated such as a peer-to-peer model.

In one embodiment, each client system $130_{1-2}$ communicates over the network 120 to interact with a virtual environment server application 115 provided by the server computer system 105. Each client $130_{1-2}$ may include a virtual environment client application 132 used to create a connection with the server system 105 and to receive and render the virtual online environment. For example, the virtual environment server 115 receives commands directing the actions of a client's avatar and tracks the status and movement of each avatar within the online environment. The virtual environment server 115 in turn sends updates to each connected client system $130_{1-2}$. As shown, client system $130_2$ also includes an avatar-controlling script 134. The avatar-controlling script 134, described in greater detail below, coordinate the actions of multiple avatars. For example, a user may launch the avatar-controlling script 134 to create a formation bot in the online environment by controlling a group of avatars at more or less the same time. Additionally, a scripted client system can also be used to connect to the virtual environment server 115 in the absence of the virtual environment client application 132. That is, the scripted client system may connect to the virtual environment server 115, exchange a set of authentication credentials and begin sending a set of commands executed by the virtual environment server 115 without using the client application 115.

Figure 2:
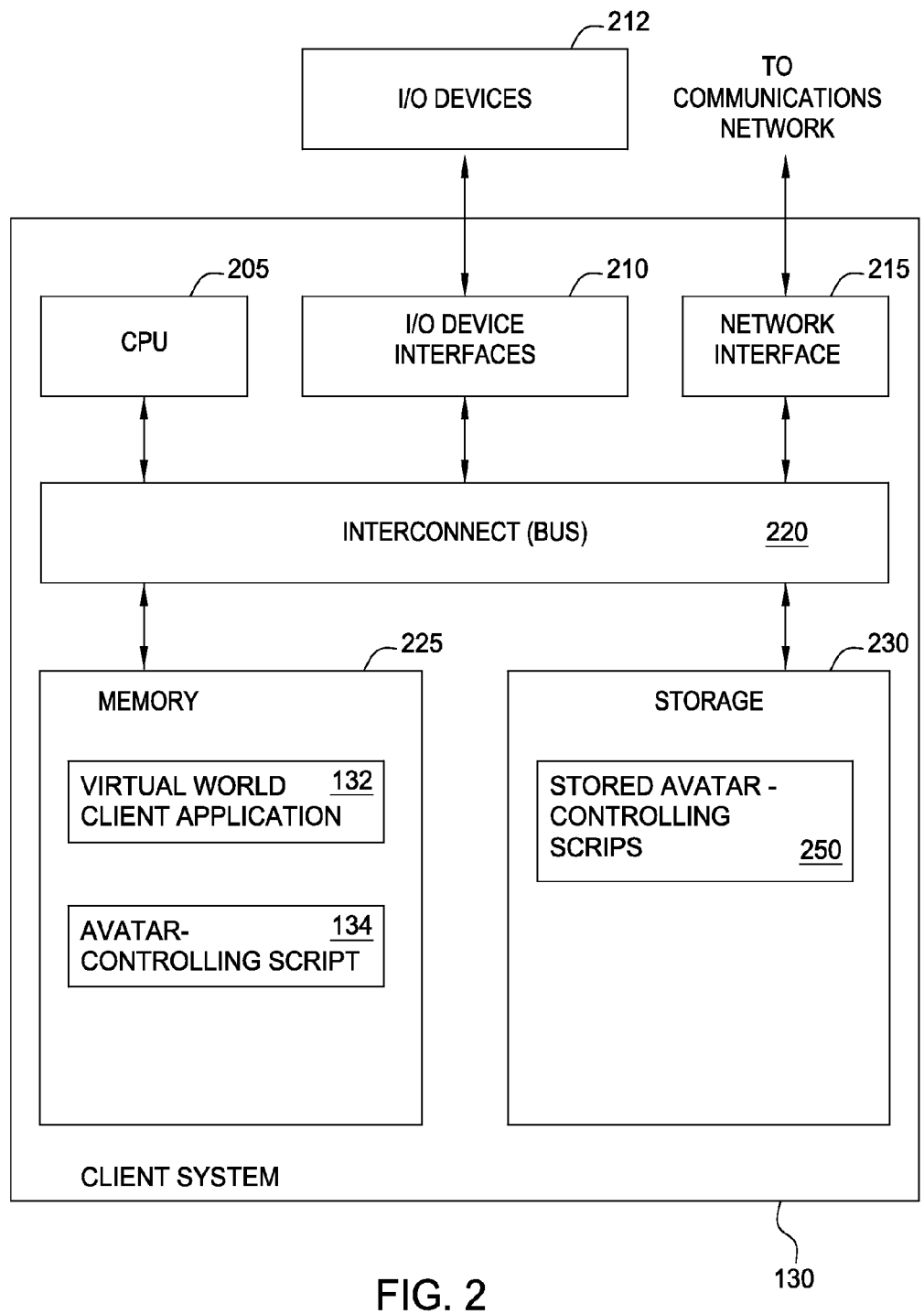
FIG. 2 is a more detailed view of the client computing system of FIG. 1, according to one embodiment of the invention.

FIG. 2 is a more detailed view of the client computing system 130 of FIG. 1, according to one embodiment of the invention. As shown, the client computing system 130 includes, without limitation, a central processing unit (CPU) 205, a network interface 215, an interconnect 220, a memory 225, and storage 230. The computing system 105 may also include an I/O devices interface 210 connecting I/O devices 212 (e.g., keyboard, display and mouse devices) to the computing system 105.

The CPU 205 retrieves and executes programming instructions stored in the memory 225. Similarly, the CPU 205 stores and retrieves application data residing in the memory 225. The interconnect 220 is used to transmit programming instructions and application data between the CPU 205, I/O devices interface 210, storage 230, network interface 215, and memory 225. CPU 205 is included to be representative of a single CPU, multiple CPUs, a single CPU having multiple processing cores, and the like. And the memory 225 is generally included to be representative of a random access memory. Storage 230, such as a hard disk drive or flash memory storage drive, may store non-volatile data.

Illustratively, the memory 225 may include the client application 132 and an avatar-controlling script 134, and the storage 230 includes stored avatar-controlling scripts 250. Using the I/O devices, the client computing system 130 may display a virtual environment as instructed by the client application 132. In one aspect, the client application 132 may be a local application. In another aspect, the client application 132 may be a web-based application written for a scripting environment running within an Internet browser.

In one embodiment, the client application 132 renders a virtual environment presenting a user with virtual locations and virtual characters, including an avatar controlled by the user. For example, the client application 132 may display a map, representing the virtual environment, and numerous characters throughout the map, representing avatars controlled by other users and non-player characters. In another example, the virtual environment client application 132 may display a fixed-camera, three-quarter view of a game world within the virtual environment. The client application 132 may also transmit user commands and updates to the virtual environment server 115 (discussed below) so as to notify the virtual environment server application 115 of changes in position and/or action of the user's avatar. That is, the client application 132 may respond to user input by generating a sequence of commands sent to the virtual environment server. The commands control the actions of that user's avatar within the virtual environment, e.g., to move from one location to another, to communicate with other users, or to interact with elements of the virtual environment.

An avatar-controlling script 134 may connect to the virtual environment server application 115 to execute commands and/or requests that control a group of avatars within the virtual environment. The script may be composed from the same command set used by the client application to translate user input into actions of the avatar. The script 134 may include a computer program written in a scripting language, such as Perl or PHP. Accordingly, the script 134 may include log-in and authentication information for an avatar, instructions and/or commands for directing an avatar to move to a certain location within the virtual environment, instructions for an avatar to communicate a certain chat message, and instructions to interact with some element of the environment. The script 134 may be manually invoked by a user or launched programmatically. In one embodiment, the script 134 may open a plurality of connections to the virtual environment server 115, each connection using the authentication information corresponding to an avatar. The script 134 may further iteratively send commands across each of the plurality of connections to coordinate behavior of a group of avatars.

A user may also place stored avatar-controlling scripts 250 in storage 230. In one embodiment, a user may store a collection of avatar-controlling scripts 250 that the user may load into memory at the user's discretion. In one embodiment, each of the stored avatar-controlling scripts 250 may cause a different formation bot to appear within the virtual environment.

Figure 3:
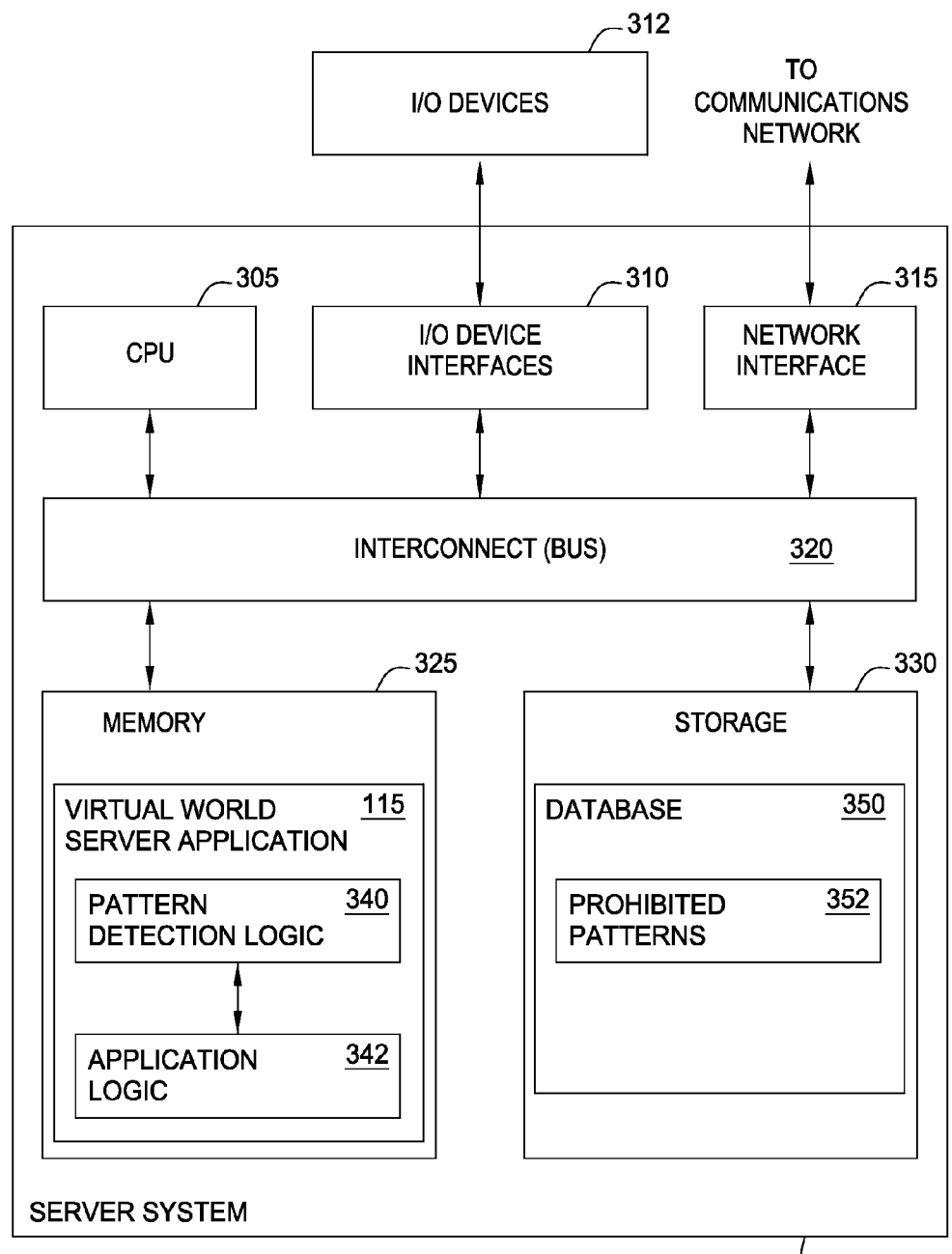
FIG. 3 is a more detailed view of the server computing system of FIG. 1, according to one embodiment of the invention.

FIG. 3 is a more detailed view of the server computing system 105 of FIG. 1, according to one embodiment of the invention. As shown, server computing system 105 includes, without limitation, a central processing unit (CPU) 305, a network interface 315, an interconnect 320, a memory 325, and storage 330. The client system 130 may also include an I/O device interface 310 connecting I/O devices 312 (e.g., keyboard, display and mouse devices) to the server computing system 105.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 120. Although shown as a single unit, the storage 330 may be a combination of fixed and/or removable storage devices, such as fixed disc drives, floppy disc drives, tape drives, removable memory cards, optical storage, network attached storage (NAS), or a storage area-network (SAN).

As shown, the memory 325 stores a virtual environment server application 115, and the storage 330 includes a database 350 storing prohibited patterns 352. Also as shown, the virtual environment server application 115 includes pattern detection logic 340 and application logic 342. Users interact with or more of the client computing systems $130_{1-2}$ to connect to an online environment hosted by the virtual environment server application 115. In some cases, a malicious user may connect, or attempt to connect, to the virtual environment server application 115 with a program other than a virtual environment client application 132 for the purpose of running script logic or perform other unauthorized behavior, e.g., by launching a script 134 configured log on with multiple accounts and to control the avatars for such multiple accounts. The server application 115 may control the online environment experience and send updates to each connected client computing systems $130_{1-2}$ regarding the current state of the virtual environment. The online environment itself may generally include multiple rooms or locations. Each room may be populated with some subset of avatars corresponding to users logged into the online environment.

In one embodiment, the server application 115 may use application logic 342 to detect suspicious behavior of connected clients $130_{1-2}$ within the virtual environment. Application logic 342 may track, monitor and/or record activity of connected clients $130_{1-2}$. For example, the application logic may track the IP addresses of connected clients $130_{1-2}$ and date and time of connections to the virtual server application 132. In another example, the application logic may determine connected clients $130_{1-2}$ are transmitting similar avatar commands in synchrony with each other.

The virtual environment server application 115 may use pattern detection logic 340 to recognize a pattern or shape formed by a group of avatars. In one embodiment, the pattern detection logic 340 searches a library of prohibited patterns 352 for a match with a pattern formed by the group of avatars. For example, the pattern detection logic 340 may determine a shape formed by a group of avatars by reducing their macroscopic appearance into a basic outline. In another embodiment, the pattern detection logic 340 may treat each avatar as a vertex connecting points within a shape.

The prohibited patterns 352 stored in the database 350 represent a library of words, symbols, or patterns that are prohibited (at least for bot formation purposes) in the online environment. The prohibited patterns 352 may include obscene or offensive language or symbols as well as language or symbols deemed inappropriate for members of the online environment. For example, the prohibited patterns 352 may represent swear words, sexual terminology, and racial slurs or symbols. In one aspect, the prohibited patterns 352 may be predetermined by the online environment provider and may be updated periodically to add or remove patterns. The prohibited patterns 352 may be stored in the database 350 as image files. Alternatively, the prohibited patterns 352 may be stored as a collection of data points mapped onto a coordinate plane. Of course, a variety of approaches may be used to characterize a given prohibited pattern within the database 350.

Figure 4:
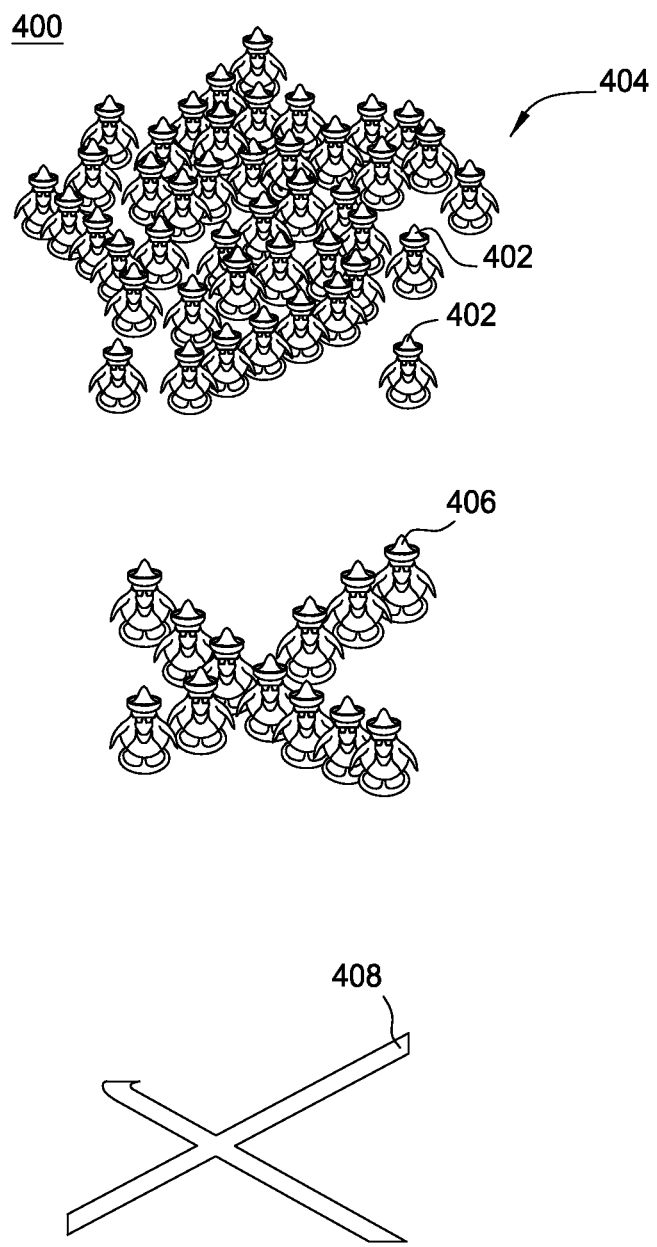
FIG. 4 illustrates a view of exemplary game room according to an embodiment of the invention.

FIG. 4 illustrates one embodiment of a game world 400 in an exemplary virtual environment. As shown, the game world 400 hosts a plurality of avatars 402. Each avatar within game world 400 may move around, as controlled by their respective users. In some cases, avatars 402 may be positioned in proximity to one another such that they form a crowd 404. The shape of the crowd 404 may shift as each user moves. As such, a myriad of shapes may inadvertently be formed by the crowd 404 and observed by users. However, the crowd 404 may also contain script-controlled avatars, configured to intentionally form a particular shape. Accordingly, embodiments of the invention may be configured to discern script-controlled avatars from normal avatars in a crowd.

As noted, pattern recognition techniques may be used to detect whether a particular group of avatars in a virtual environment are attempting to form (or have formed) a shape. In one embodiment, pattern recognition may be performed on all avatars 402 in a game world 400 within the online environment. However, as the number of avatars 402 in the game world 400 increases, the likelihood of matching any pattern whatsoever increases. For example, by examining crowd 404, a user may observe groupings of avatars that form a diamond shape and several line shapes, but it is unclear from the appearance alone whether these formations were intentionally formed by the avatars 402 or are merely a coincidental arrangement. Some users may also unintentionally be involved in a bot formation. For example, an innocent user's avatar may accidentally walk near a formation bot displaying a prohibited shape, making the avatar susceptible to being labeled part of a formation bot when pattern detection is performed.

To focus on higher-risk user accounts, avatars may be filtered from the "noise" of innocent avatars in the crowd 404 based on an evaluation of user account activity. Filtering out avatars decreases the likelihood of false-positives and prevents unfairly punishing users that may have been unintentionally involved in a prohibited pattern, as described above. The filtered out avatars from the crowd 404 are ignored and may be considered hidden for sake of the pattern matching analysis. As illustrated in FIG. 4, a virtual environment server may select a targeted group of avatars 406 and disregard all other avatars. The targeted group may be selected based on a set of common characteristics of the avatars in the group. For example, a group of avatars that all originates from one IP address. In one embodiment, the virtual environment server may determine a shape formed by the targeted group avatars 406. In the example of FIG. 4, the virtual environment server determines the targeted group of avatars 406 has formed an 'X' shape 408. Presuming this was a prohibited formation bot pattern, the virtual environment server 115 could perform some action to disrupt the pattern formed by the group of avatars 406.

For example, the virtual environment server could disconnect (and potentially ban) each avatar in the targeted group of avatars 406 from the online environment. Such a ban could be made permanent for "repeat offenders," where avatars associated with a given IP address are repeatedly observed to form prohibited patterns. Alternatively, the remedial action could simply be to cause some (or all) of the targeted group of avatars 406 to move in a random direction by a specified distance.

Figure 5:
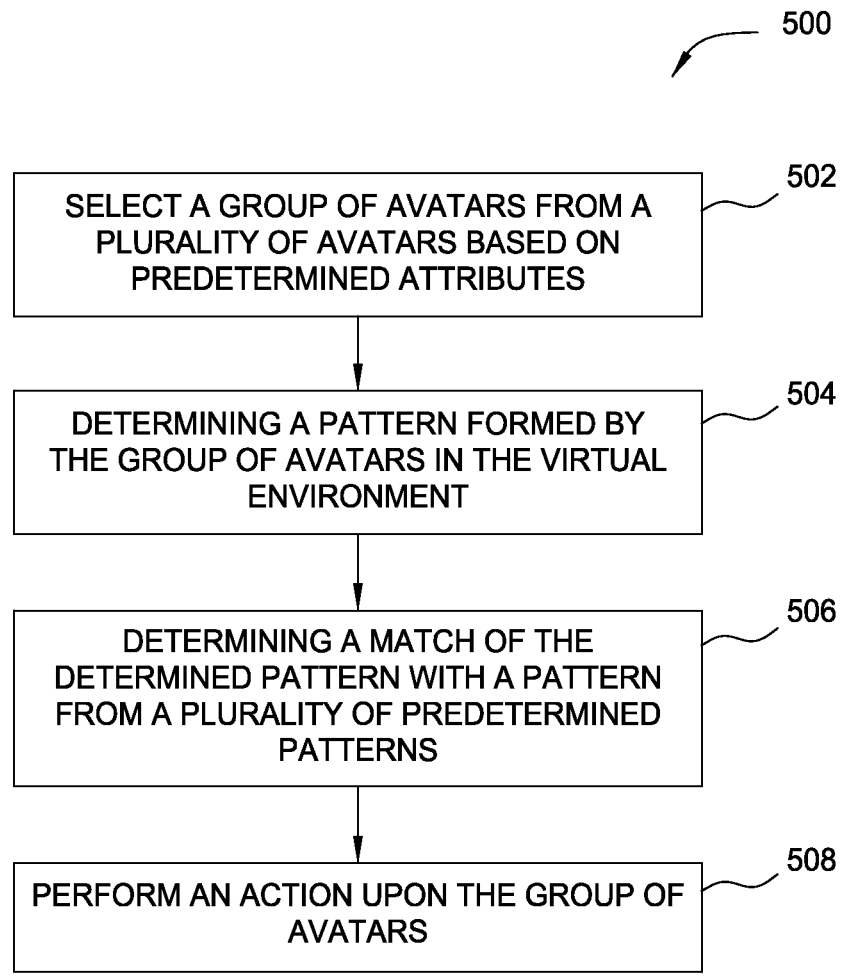
FIG. 5 is a flow diagram illustrating a method for preventing formation bots from disrupting an online environment, according to an embodiment of the invention.

FIG. 5 is a flow diagram illustrating a method for preventing formation bots from disrupting an online environment, according to one embodiment of the invention. As shown, the method 500 begins at step 502, where a virtual environment server may select a group of avatars from a plurality of avatars in a game world. In one embodiment, the group of avatars may be selected based on avatar attributes which indicate the avatar may be a script-controlled bot.

Examples of attributes that may be used to select a subgroup of avatars include avatars that are connected from the same originating network address (i.e., IP address), avatars that have a virtual environment connection time within close temporal proximity, and avatars that have an account creation date and time within close temporal proximity. Other avatar attributes that may be evaluated include avatars which transmit events or commands in rapid succession (indicating a script is sending the commands as opposed to a user interacting with a keyboard), avatars that have the same customized appearance, avatars transmitting identical or similar commands or events (e.g., move left, move down), and avatars created using the same login credentials (e.g., user account email address).

At step 504, the virtual environment avatar may determine a pattern formed by the group of avatars selected at step 502. The pattern may be based on the arrangement and orientation of the group of avatars within the virtual environment. In one aspect, the virtual environment server may treat each avatar as a vertex point and determine a pattern based on the spatial relationship between each vertex. For example, two pairs of equidistant avatars could be determined to be in a square-shaped pattern. The virtual environment server may also determine the pattern based on the macroscopic appearance of the avatars within the virtual environment. For example, two vertical columns of overlapping avatars bisected by a horizontal row of avatars placed next to a single vertical column of avatars may be determined to be a pattern shaped as the word "HI." In yet another aspect, a map may be created containing each avatar's coordinates within a given game room, the plots on the map comprising the detected pattern.

At step 506, the virtual environment server may determine whether the determined pattern also matches a predetermined pattern. In one aspect, the virtual environment server may employ a fuzzy-match-style search to compare determined pattern against those stored in a library of identified and known prohibited words or symbols. That is, an exact match is not required. In another aspect, the search may compare coordinates of the selected avatars with key coordinates of prohibited words or symbols. The search may employ any other suitable means for image comparison or pattern detection.

The virtual environment server may also determine a metric of certainty or probability corresponding to the match of the determined avatar pattern with a prohibited pattern. For example, the virtual environment server may determine to a 90% certainty that a group of avatars resemble a given prohibited word.

At step 508, the virtual environments server may execute a remedial action to disrupt the formation of the group of avatars. In one embodiment, the virtual environment server may flag the group of users for further review by a virtual environment moderator. Alternatively, as noted above, the virtual environment server may permanently ban the group of avatars from the virtual environment (or the user that created such avatars). In yet another aspect, the virtual environment server may temporary remove, or kick, the group of avatars from a given game world within the virtual environment. Other remedial actions include documenting incidences of detected formation bot behavior in a user history (which could itself lead to a user being banned as a "repeat offender") and throttling a user's access to the virtual environment.

While embodiments of the invention are described above relative to avatar formations within a game world, the pattern detection techniques may adapted to evaluate patterns formed using other objects within the virtual environment. That is, the embodiments described above may be used to detect players using non-avatar objects to spell prohibited words or form prohibited shapes. For example, the technique may be used to detect prohibited words, shapes, or symbols formed by the placement of in-game furniture or objects arranged by a user's avatar. In another example, the technique may be used in detecting illegal shapes formed by formations of units within a real-time strategy game.

Advantageously, embodiments of the invention may be used to provide a better user experience in certain online environments; particularly in online environments where bots may be used to create formations that present offensive or objectionable materials to other users. As noted, because avatars may congregate in large numbers at key points within a popular online service, it becomes statistically likely that any given pattern will eventually be matched by the uncoordinated actions of multiple users, each controlling one avatar. Accordingly, subgroups of avatars may be selected for the pattern matching process. By selecting subgroups of avatars based on attributes that indicate the subgroup is under the control of a common user (or users), the occurrence of a prohibited pattern is more likely through the coordinated actions of such a user (or users). Accordingly, embodiments of the invention reduce the occurrence of false-positives in identifying a prohibited pattern. When a subgroup of avatars is determined to have formed a prohibited pattern, a remedial action may be performed to disrupt the pattern.

While the foregoing is directed to embodiments of the present invention, other and further embodiments of the invention may be devised without departing from the basic scope thereof, and the scope thereof is determined by the claims that follow.

What is claimed is:

1. A computer-implemented method to limit display of prohibited patterns in a virtual environment, comprising:
   determining that a group of avatars are controlled by an automated computer program code, and not controlled by a user, based on predetermined attributes of the group of avatars;
   determining that the automated computer program code, and not the user, has issued commands that cause the group of avatars to be disposed in a formation in the virtual environment in a manner that visually matches a prohibited pattern when viewed from an aerial perspective, by;
   creating a map containing coordinates of each of the group of avatars creating the formation; and matching a threshold number of the coordinates of the map to a predefined set of coordinates of the prohibited pattern,
   wherein the prohibited pattern defines a formation of avatars that resembles at least one of: (i) a prohibited word, (ii) a prohibited symbol, and (iii) a prohibited shape; and
   performing a remedial action to disrupt the current disposition of the group of avatars, thereby limiting display of prohibited patterns in the virtual environment.

2. The computer-implemented method of claim 1, wherein the predetermined attributes comprise a rate at which each of the group of avatars transmit events or commands, wherein the automated computer program code comprises a script, wherein the script includes a set of instructions to issue the commands, wherein the issued commands control a movement and a position of the group of avatars in order to cause the group of avatars to be disposed in the formation in the virtual environment.

3. The computer-implemented method of claim 2, wherein the predetermined attributes further comprise an originating network address connecting each of the group of avatars to the virtual environment.

4. The computer-implemented method of claim 3, wherein the predetermined attributes further comprise a connection date and time of each of the group of avatars to the virtual environment.

5. The computer-implemented method of claim 4, wherein the predetermined attributes further comprise an account creation date and time of each of the group of avatars.

6. The computer-implemented method of claim 5, wherein the prohibited pattern is selected from a plurality of prohibited patterns, wherein each of the plurality of prohibited patterns comprises a predefined set of coordinates representing: (i) the prohibited word, (ii) the prohibited symbol, and (iii) the prohibited shape.

7. The computer-implemented method of claim 6, wherein the remedial action to disrupt the disposition of the group of avatars comprises moving one or more of the avatars in the group of avatars from an initial location in the virtual environment to a second location in the virtual environment.

8. The computer-implemented method of claim 7, wherein the remedial action comprises disconnecting one or more of the avatars in the group of avatars from the virtual environment, wherein the remedial action is performed by an application configured to limit, in respective instances, display of each of: (i) the prohibited word, (ii) the prohibited symbol, and (ii) the prohibited shape in the virtual environment.

9. A computer-readable storage medium storing a program, which, when executed by a processor performs an operation to limit display of prohibited patterns in a virtual environment, the operation comprising:
determining that a group of avatars are controlled by an automated computer program code, and not controlled by a user, based on predetermined attributes of the group of avatars;
determining that the automated computer program code, and not the user, has issued commands that cause the group of avatars to be disposed in a formation in the virtual environment in a manner that visually matches a prohibited pattern when viewed from an aerial perspective, by:
creating a map containing coordinates of each of the group of avatars creating the formation;
and matching a threshold number of the coordinates of the map to a predefined set of coordinates of the prohibited pattern, wherein the prohibited pattern defines a formation of avatars that resembles at least one of: (i) a prohibited word, (ii) a prohibited symbol, and (iii) a prohibited shape; and performing a remedial action to disrupt the current disposition of the group of avatars, thereby limiting display of prohibited patterns in the virtual environment.

10. The computer-readable storage medium of claim 9, wherein the predetermined attributes comprise a rate at which each of the group of avatars transmit events or commands, wherein the automated computer program code comprises a script, wherein the script includes a set of instructions to issue the commands, wherein the issued commands control a movement and a position of the group of avatars in order to cause the group of avatars to be disposed in the formation in the virtual environment.

11. The computer-readable storage medium of claim 10, wherein the predetermined attributes further comprise an originating network address connecting each of the group of avatars to the virtual environment.

12. The computer-readable storage medium of claim 11, wherein the predetermined attributes further comprise a connection date and time of each of the group of avatars to the virtual environment.

13. The computer-readable storage medium of claim 12, wherein the predetermined attributes further comprise an account creation date and time of each of the group of avatars.

14. The computer-readable storage medium of claim 13, wherein the remedial action to disrupt the disposition of the group of avatars comprises moving one or more of the avatars in the group of avatars from an initial location in the virtual environment to a second location in the virtual environment.

15. A system, comprising: a processor; and a memory, wherein the memory includes an application program configured to perform an operation to limit display of prohibited patterns in a virtual environment, the operation comprising:
determining that a group of avatars are controlled by an automated computer program code, and not controlled by a user, based on predetermined attributes of the group of avatars;
determining that the automated computer program code, and not the user, has issued commands that cause the group of avatars to be disposed in a formation in the virtual environment in a manner that visually matches a prohibited pattern when viewed from an predefined aerial perspective, by:
creating a map containing coordinates of each of the group of avatars creating the formation; and
matching a threshold number of the coordinates of the map to a predefined set of coordinates of the prohibited pattern, wherein the prohibited pattern defines a formation of avatars that resembles at least one of: (i) a prohibited word, (ii) a prohibited symbol, and (iii) a prohibited shape; and
performing a remedial action to disrupt the current disposition of the group of avatars, thereby limiting display of prohibited patterns in the virtual environment.

16. The system of claim 15, wherein the predetermined attributes comprise a rate at which each of the group of avatars transmit events or commands, wherein the automated computer program code comprises a script, wherein the script includes a set of instructions to issue the commands, wherein the issued commands control a movement and a position of the group of avatars in order to cause the group of avatars to be disposed in the formation in the virtual environment.

17. The system of claim 16 wherein the predetermined attributes further comprise one of an originating network address connecting each of the group of avatars to the virtual environment and a connection time of each of the group of avatars to the virtual environment.

18. The system of claim 17, wherein the predetermined attributes further comprise an account creation date and time of each of the group of avatars.

19. The system of claim 18, wherein the remedial action to disrupt the disposition of the group of avatars comprises moving one or more of the avatars in the group of avatars from an initial location in the virtual environment to a second location in the virtual environment and disconnecting one or more of the avatars in the group of avatars from the virtual environment.

* * * * *

UNITED STATES PATENT AND TRADEMARK OFFICE
CERTIFICATE OF CORRECTION

| | | |
|---|---|---|
| PATENT NO. | : 8,913,063 B2 | Page 1 of 1 |
| APPLICATION NO. | : 12/870613 | |
| DATED | : December 16, 2014 | |
| INVENTOR(S) | : Kevin Yockey | |

It is certified that error appears in the above-identified patent and that said Letters Patent is hereby corrected as shown below:

In the Claims:

Column 12, Claim 15, Line 30, please delete "predefined".

Signed and Sealed this
Fifth Day of May, 2015

Michelle K. Lee
*Director of the United States Patent and Trademark Office*